M. CHRISTMAN & E. JOHNSON.
PISTON VALVE.
APPLICATION FILED JULY 5, 1910.
Reissued July 18, 1911.
13,272.
2 SHEETS—SHEET 1.
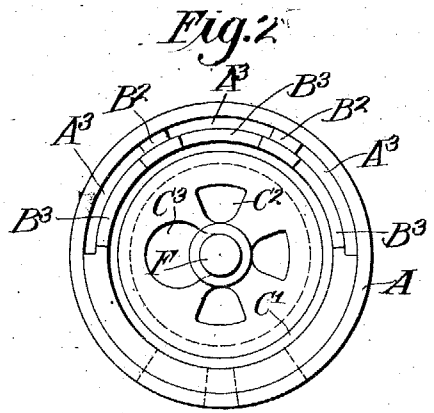
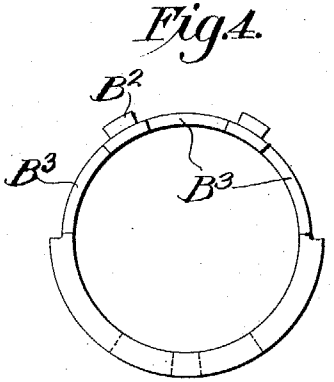
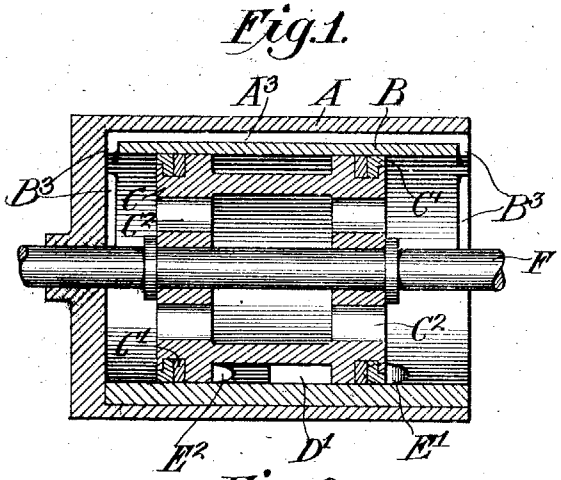
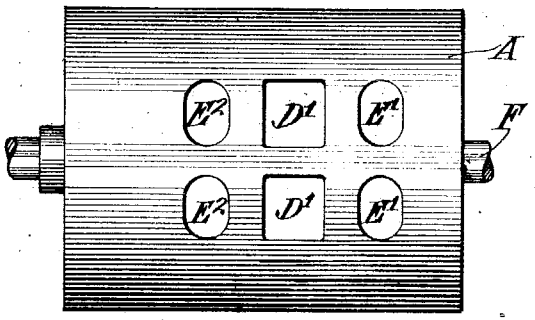
Witnesses
Frank P. Hom
H. C. Rod
Inventor
Matthias Christman
and Edward Johnson
By George H. Thorpe Atty.

M. CHRISTMAN & E. JOHNSON.

PISTON VALVE.

APPLICATION FILED JULY 5, 1910.

Reissued July 18, 1911. 13,272.

2 SHEETS—SHEET 2.

Witnesses
Frank P. Glore
H. C. Rodgers

Inventor
Matthias Christman
and Edward Johnson
By George H. Thorpe Atty.

UNITED STATES PATENT OFFICE.

MATTHIAS CHRISTMAN AND EDWARD JOHNSON, OF SPRINGFIELD, MISSOURI.

PISTON-VALVE.

13,272. Specification of Reissued Letters Patent. Reissued July 18, 1911.

Original No. 904,839, dated November 24, 1908, Serial No. 400,116. Application for reissue filed July 5, 1910. Serial No. 570,505.

*To all whom it may concern:*

Be it known that we, MATTHIAS CHRISTMAN and EDWARD JOHNSON, citizens of the United States, and residents of Springfield, in the county of Greene, State of Missouri, have invented certain new and useful Improvements in Piston-Valves, of which the following is a specification.

Our invention relates to improvements in valves for air and liquid pumps, the object of which is to provide a reversing piston valve that will be steam tight, durable and easily operated.

Figure 7:
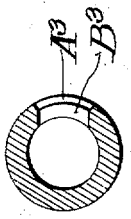
Figure 6:
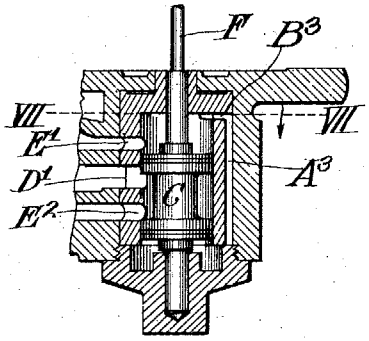
Figure 5:
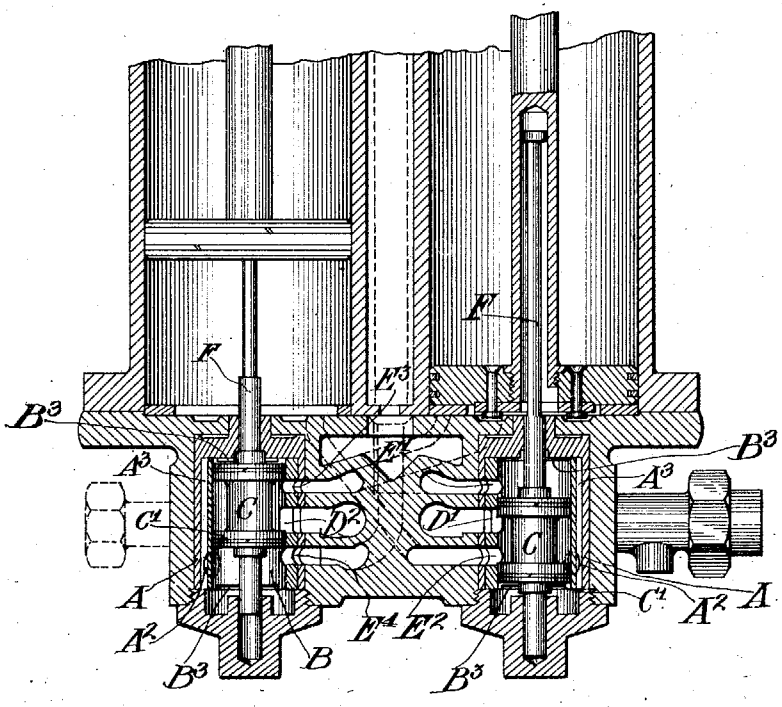

Figure 1, is a longitudinal sectional view showing the entire device. Fig. 2, is a transverse view. Fig. 3, is the outer bushing, showing steam and exhaust ports. Fig. 4 is the end view of the inner bushing. Fig. 5, is a view showing the valve and bushing applied to a duplex pump. Fig. 6, is a vertical section showing the bushing as made in one piece. Fig. 7, is a section of the one-piece bushing, on the line VII—VII of Fig. 6.

A is the outer bushing having ports at one end $A^2$.

B is the inner bushing that fits into the outer bushing A, and is provided with ribs $B^2$, which separate inner and outer bushings, forming ports or passages $A^3$, lengthwise of bushings and also has steam passages in each end $B^3$.

C is a valve which is made circular to fit into the inner bushing B and has radial braces or spokes at each end, and is provided with one or more packing rings $C^1$ (and is provided with openings $C^2$ at each end of valve). Said valve is made hollow so steam can pass through valve, which makes this valve perfectly balanced. Said valve is provided with a slip pin-hole $C^3$, by which the reversing rod F is put into place. The valve being similar to piston throttle valve, as illustrated in prior Letters Patent #860,190 granted to us on the 16th day of July, 1907, Serial #351,379.

The valve operates as follows:

The invention is put into the steam chest of a pump as shown in Fig. 5.

Steam from the boiler enters at steam ports $A^2$, and then passes through ports or passages $A^3$, and then steam passes through ports $B^3$ to the valve C.

As shown in Fig. 5, the right steam piston has completed its stroke and forced the valve C down, which is connected with the reversing rod F, and the valve C has uncovered the upper steam port $E^1$, which will admit steam in the upper port in the left steam cylinder of the air pump through suitable ports or passages between both steam cylinders. The steam forces the left steam piston in the air pump down, which strikes the reversing rod F which is connected with the valve C and moves the valve C down, which closes the lower steam port $E^4$, and uncovers the upper steam port $E^3$. Steam is then admitted to the right steam piston in the bottom end through suitable ports or passages in the cylinder head of the air pump to the right steam cylinder. The right steam piston then moves upward, pulls the valve C up, which is connected with the reversing rod F and a plate tapped to the bottom of the right steam piston. The valve C then closes the upper steam port $E^1$, and the steam that has been expanded in the upper end of the left steam cylinder of the air pump, passes back through suitable ports or passages between both steam cylinders, back through the steam port $E^1$ and out through the exhaust cavity cut in the valve C and out through the exhaust port $D^1$, which corresponds with ports or passages in the cylinder head of the air pump, out into the atmosphere.

The lower steam port $E^2$ is now uncovered. Steam now passes over to the bottom of left steam piston in the air pump through suitable ports or passages in the cylinder head of the air pump. The left steam piston in the air pump is on an upward stroke. It pulls the valve C up, which is connected with the reversing rod F and a plate tapped to the bottom of the left steam piston in the air pump, the valve closes the upper steam port $E^2$, and the steam that has been expanded in the lower end of the right steam cylinder of the air pump passes back through suitable ports or passages in the cylinder head of the air pump, back through the steam port $E^3$, and out through the exhaust cavity cut in the valve C, and out through the exhaust port $D^2$, which corresponds with suitable ports or passages in the cylinder head of the air pump, out into the atmosphere.

The bushings can be made in one piece, but are preferably made separate. The outer bushing made of steel or wrought iron. The inner bushing made of cast iron; making it cheap and easily renewed when worn. In the one piece bushing, shown in Figs. 6 and 7, the parts which correspond to similar parts in the two-piece bushing are identified by the same reference characters.

Having thus described the invention what we claim as new and desire to secure by Letters Patent of the United States, is:—

1. In combination with an engine cylinder steam chest, suitable inlet and exhaust passages an outer bushing, an inner bushing, longitudinal fluid passages between said bushings, a port at each end connecting the interior of the inner bushing with said longitudinal passages, a piston valve connected to reciprocate within the inner bushing, said valve comprising two heads spaced apart to form an exhaust groove, spring packing rings on each head, and ports through both bushings to connect with said inlet and exhaust passages, substantially as shown and described.

2. In combination with an engine cylinder, steam chest, inlet and exhaust passages a valve casing comprising two concentric bushings, fluid passages between the bushings connected with the interior of the inner bushing at the ends thereof, a piston valve bored to receive a valve stem, a slip pin hole to one side of and connecting with the bore to allow the valve stem to be fitted, and a valve stem adapted to snugly fit said bore and having collars thereon to prevent endwise slipping of the valve, substantially as shown and described.

3. A piston valve having passages extending therethrough to permit of the valve being perfectly balanced, a central bore through which passes a valve stem, said valve stem fitted with collars at each end of the valve to prevent endwise slipping of the same, and a slip pin hole adjacent to the bore by means of which the valve stem may be fitted to the valve, substantially as shown and described.

4. A piston valve, comprising a stationary hollow cylindrical bushing closed at both ends and provided at one end with a steam supply port for the passage of steam into the bushing, and provided also with an exhaust port about midway its length and a pair of inlet ports, one of the inlet ports lying between the exhaust port and the steam supply port, and the other inlet port of the opposite side of the exhaust port from the first-named inlet port, a valve fitting reciprocally in the bushing and provided with packing rings engaging the same and diametrically reduced between the packing rings to form an exhaust cavity of sufficient length to establish communication between either of the inlet ports and the said exhaust port; said valve being also open from end to end to permit steam to exteriorly bear against both ends of and balance the valve, and a reciprocatory rod secured to an extending through the valve.

5. A piston valve, comprising a stationary hollow cylindrical bushing closed at both ends and provided with a longitudinal channel and ports connecting the opposite ends of said channel with the adjacent ends of the chamber of the bushing; said bushing being also provided with an opening to admit steam to said channel and with a pair of inlet ports and an exhaust port between the inlet ports, a valve arranged reciprocally in the bushing and provided peripherally with packing rings and diametrically reduced between said packing rings to form a chamber of length sufficient to establish communication between either of the inlet ports and the exhaust port; and a rod secured to the valve and extending slidingly through one of the closed ends of the bushing.

6. A piston valve comprising a stationary hollow cylindrical bushing closed at both ends and provided at one end with a steam supply port for the passage of steam into the bushing and provided also with an exhaust port about midway its length and a pair of inlet ports, one of the inlet ports lying between the exhaust port and the steam supply port and the other inlet port at the opposite side of the exhaust port from the first-named inlet port, a valve fitting reciprocally in the bushing and diametrically reduced to form a surrounding exhaust cavity of sufficient length to establish communication between either of the inlet ports and the said exhaust port, said valve being also open from end to end to permit steam to bear exteriorly against both ends of and balance the valve, and a reciprocatory rod secured to the valve.

In testimony whereof, we affix our signatures in the presence of two witnesses.

MATTHIAS CHRISTMAN.
EDWARD JOHNSON.

Witnesses:
WM. H. HORINE,
JOHN J. SCHNEIDER.